United States Patent
Kevern et al.

(10) Patent No.: US 6,435,730 B1
(45) Date of Patent: Aug. 20, 2002

(54) OPTICAL FIBER CONNECTOR WITH IMPROVED FERRULE FLOAT FEATURE

(75) Inventors: James David Kevern, Wellsville; Randy Marshall Manning, Lemoyne, both of PA (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/305,888

(22) Filed: May 5, 1999

Related U.S. Application Data

(60) Provisional application No. 60/084,406, filed on May 6, 1998.

(51) Int. Cl.[7] .................................................. G02B 6/36
(52) U.S. Cl. .............................. 385/78; 385/60; 385/68; 385/87
(58) Field of Search ....................... 385/52–56, 59, 385/58, 60, 62, 65–66, 68–69, 76, 78–79, 87

(56) References Cited

U.S. PATENT DOCUMENTS

| | | | | |
|---|---|---|---|---|
| 4,515,434 A | | 5/1985 | Margolin et al. | 350/96.21 |
| 4,605,281 A | | 8/1986 | Hellewell | 350/96.21 |
| 5,082,344 A | * | 1/1992 | Mulholland et al. | 385/60 |
| 5,097,523 A | * | 3/1992 | Marie | 385/59 |
| 5,157,749 A | | 10/1992 | Briggs et al. | 350/60 |
| 5,230,032 A | | 7/1993 | Muzslay | 385/66 |
| 5,287,425 A | * | 2/1994 | Chang | 385/60 |
| 5,311,609 A | | 5/1994 | Abe | 385/60 |
| 5,381,500 A | * | 1/1995 | Edwards et al. | 385/78 |
| 5,394,497 A | * | 2/1995 | Erdman et al. | 385/78 |
| 5,396,572 A | | 3/1995 | Bradley et al. | 385/78 |
| 5,481,634 A | | 1/1996 | Anderson et al. | 385/76 |
| 5,563,971 A | * | 10/1996 | Abenschein | 385/55 |
| 5,563,974 A | | 10/1996 | Carpenter et al. | 385/85 |
| 5,661,843 A | | 8/1997 | Rickenbach et al. | 385/147 |
| 5,673,346 A | | 9/1997 | Iwano et al. | 385/60 |
| 5,774,611 A | * | 6/1998 | Nagase et al. | 385/58 |
| 5,809,192 A | * | 9/1998 | Manning et al. | 385/78 |
| 6,085,003 A | * | 7/2000 | Knight | 385/59 |
| 6,135,644 A | * | 10/2000 | Hakogi et al. | 385/78 |

FOREIGN PATENT DOCUMENTS

| | | |
|---|---|---|
| GB | 2 111 243 A | 6/1983 |
| JP | 61217008 | 9/1986 |

* cited by examiner

*Primary Examiner*—Frank G. Font
*Assistant Examiner*—Sang H. Nguyen

(57) ABSTRACT

A fiber optic connector utilizing a fiber array ferrule 20 has a housing 1 with an internal geometry that provides transverse alignment of the ferrule relative to the housing 1 when the connector is in an unmated condition and permits transverse displacement of the ferrule relative to the housing when the connector is in a mated condition. This structure advantageously permits proper pre-mating alignment with a mating connector ferrule or other optical device while also improving isolation of the ferrule from external loads imposed on the housing 1 when the connector is in a mated condition.

35 Claims, 4 Drawing Sheets

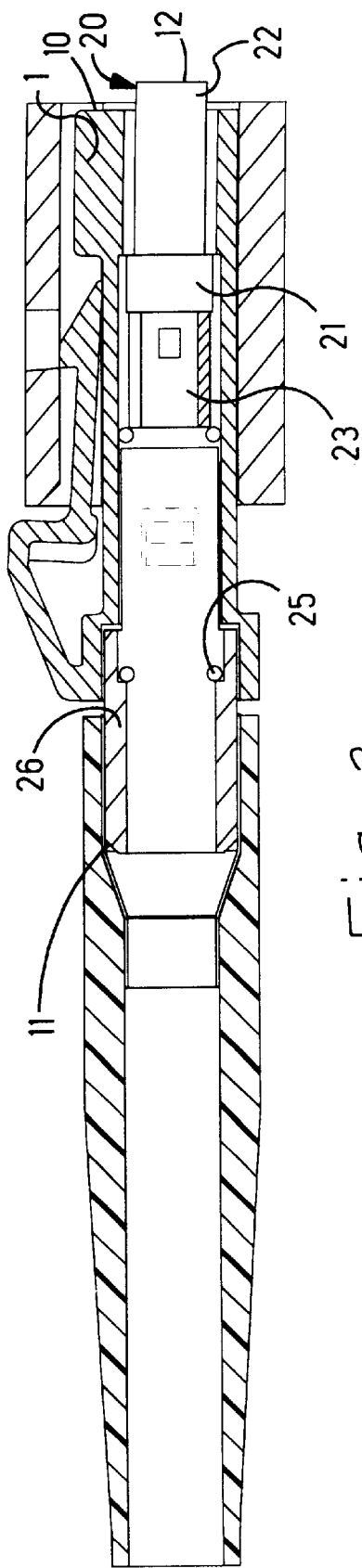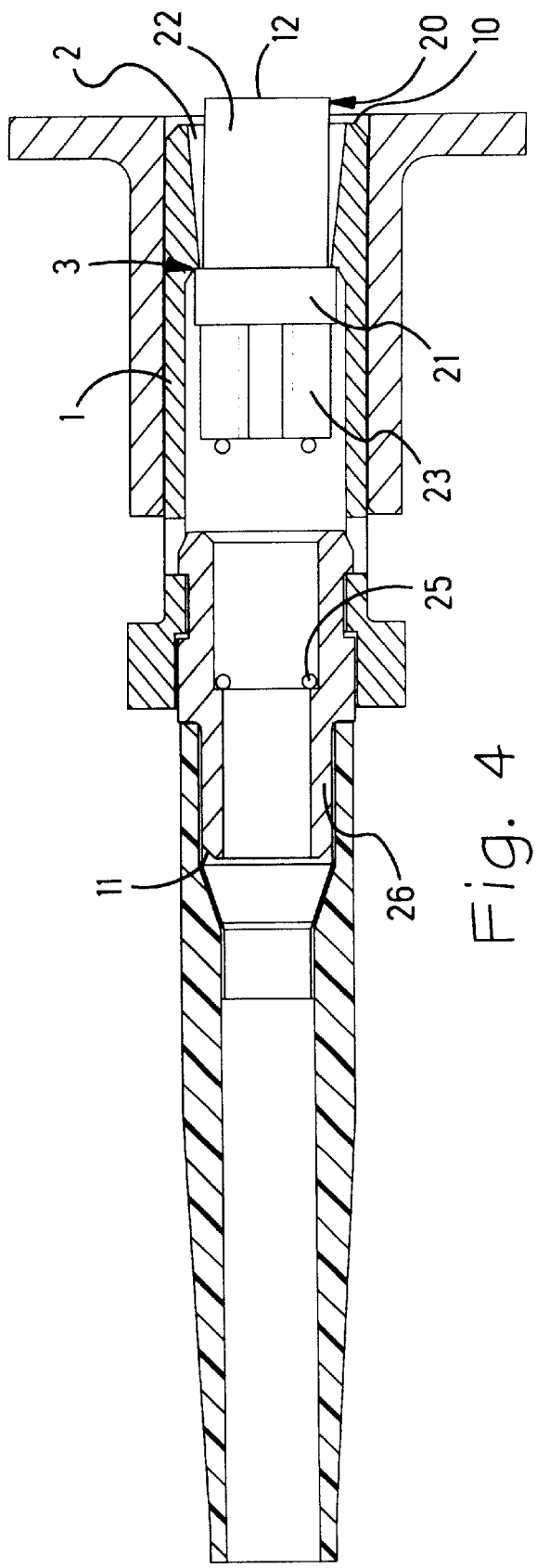
Fig. 3
Fig. 4

OPTICAL FIBER CONNECTOR WITH IMPROVED FERRULE FLOAT FEATURE

This application is based on Provisional application No. 60/084,406, filed May 6, 1998, and claims priority thereto under 35 U.S.C. §1.119(e).

BACKGROUND

Optical communications are conventionally implemented using multiple fiber optic cables in a series interconnected structure. Each fiber optic cable in the series is terminated with fiber optic connectors at separable interfaces between mating fiber optic cables. The separable interface may be physically located at any point along an optical interconnection path, including, but not limited to a central switching office, a local switching area, a premises distribution closet, and a user's office. At any point along the path, the optical information may be converted to electrical information for further distribution. Many different types of optical connectors are known, each being particularly suited to a known interconnection environment. The purpose of the optical connectors is to securely and precisely align fiber cores of the mating fiber optic cables to permit light transmission from one fiber core to the next with minimum loss of optical energy.

One known fiber optic connector for high density applications uses a ferrule that houses a plurality of fibers, termed a fiber array ferrule. The fiber array ferrule has a plurality of fiber holes for receipt of respective fibers in a fiber optic cable. The mating fiber array ferrule has a respective plurality of fiber holes for receipt of respective fibers in the mating fiber optic cable. The holes in both ferrules are similarly positioned relative to each other so as to have a one-to-one correspondence and axial alignment between individual fibers when the ferrules are mated. In the conventional fiber array ferrule, fiber hole alignment is achieved using two precision guide pins and/or guide pin holes disposed on distal sides of a mating interface. The guide pin hole in a first ferrule receives the guide pin in the mating ferrule for precise alignment. Conventionally, one ferrule may have one or two guide pins with the mating ferrule having one or two guide pins with the mating ferrule having one or no guide pins, respectively. As one of ordinary skill can appreciate, it is the position of the guide pins and guide pin holes relative to the fiber holes and the precision of the fit between the guide pins and the guide pin holes that determine the alignment precision of the mated interconnection between fiber optic cables terminated with mating fiber array ferrules. As a consequence of the small diameters of the guide pins and the guide pin holes, resulting in small annular lead-in features, the pre-mating alignment of ferrules must be reasonably close to the post-mating alignment of mating ferrules in order to initiate receipt of the guide pins in the guide pin holes. Conventionally, there is a minimum alignment of freedom of movement or float between the housing and the ferrule in order to assure adequate pre-mating alignment of the guide pin to guide pin hole. The close fit between the ferrule and housing together with the annular lead-ins at the end of the guide pins to accommodate a certain degree of pre-mating misalignment and permit the guide pins and guide pin holes to perform the alignment function uninhibited.

A disadvantage in the close fit between the fiber array ferrule and the housing lies in the lack of isolation for the fiber array ferrule to external loads placed on the housing. There is a need, therefore, for a fiber array connector providing adequate pre-mating ferrule to ferrule alignment and having improved isolation for the ferrule from external loads to the housing.

SUMMARY

It is an object to provide a fiber optic connector having adequate pre-mating ferrule to ferrule alignment and having improved isolation for the ferrule from external loads to the housing.

A fiber optic connector comprises a housing having an axial passageway defining a longitudinal axis and having a ferrule disposed therein. The housing has a ferrule alignment structure. The ferrule alignment structure transversely aligns the ferrule relative to the longitudinal axis when the connector is in an unmated condition. The ferrule alignment structure permits transverse displacement of the ferrule relative to the housing when the connector is in a mated condition.

It is an advantage that a fiber optic connector has adequate pre-mating ferrule to ferrule alignment as well as improved isolation for the ferrule from external loads to the housing when the connector is in a mated condition.

BRIEF DESCRIPTION OF THE DRAWINGS

Embodiments of the invention will now be described by way of example and with reference to the appended drawings in which:

FIG. 3 is a lengthwise cross-sectional view of an embodiment of a fiber optic connector according to the teachings of the present invention shown in an undetented position relative to a mating receptacle.

FIG. 4 is a traverse cross-sectional view of the fiber optic connector shown in FIG. 3 of the drawings.

DETAILED DESCRIPTION OF THE PREFERRED EMBODIMENTS

Figure 1:
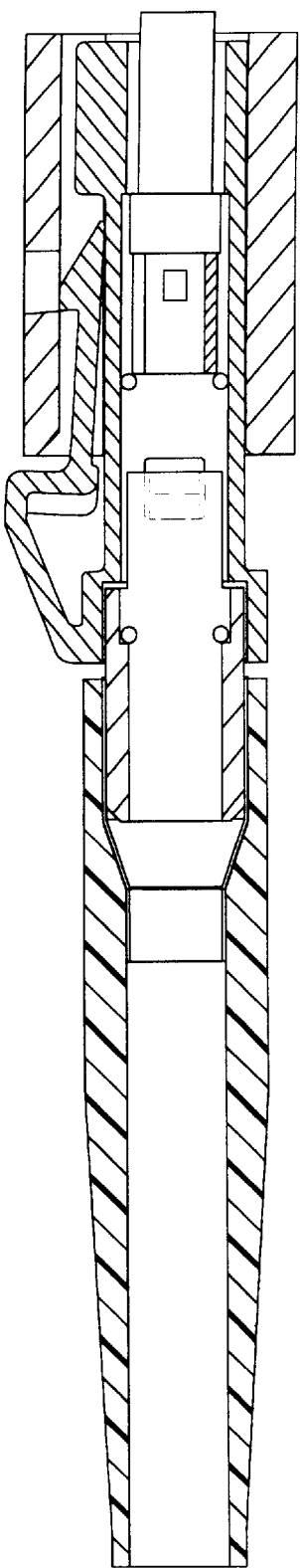
FIG. 1 is a lengthwise cross-sectional view of a conventional fiber array ferrule and connector housing shown in an undetented position relative to a mating receptacle.
Figure 2:
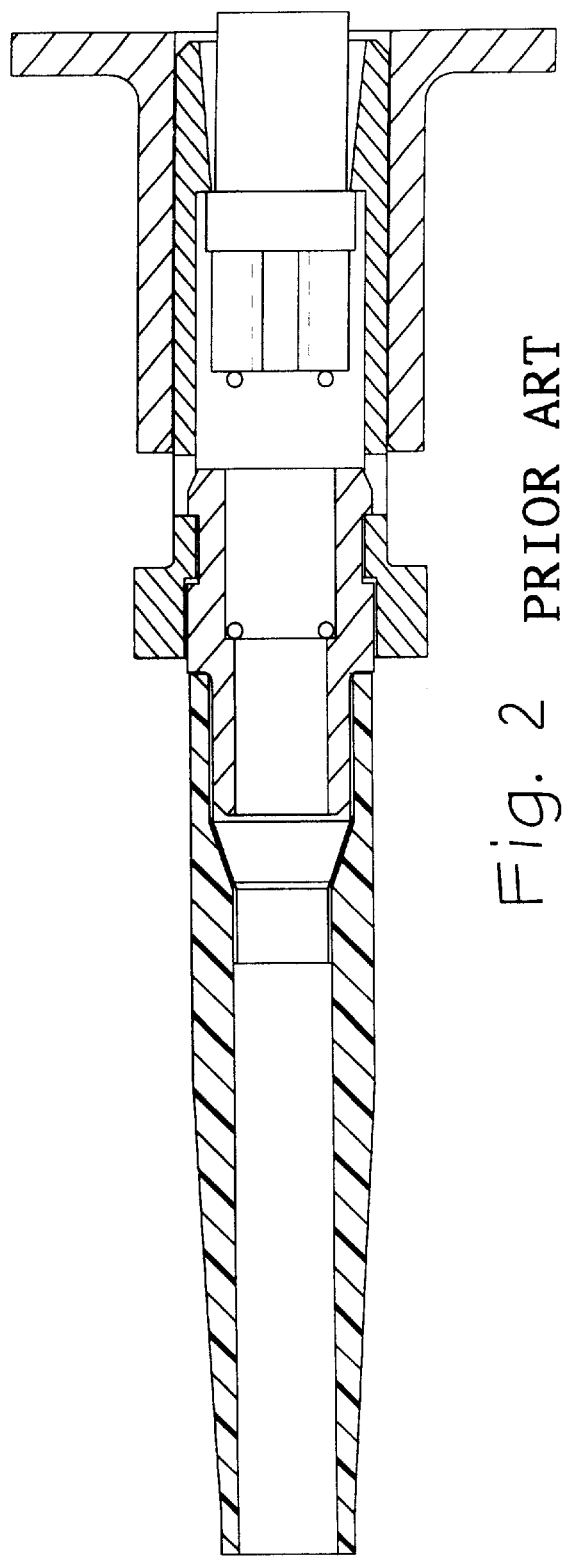
FIG. 2 is a transverse cross-sectional view of a conventional fiber array ferrule and connector housing.

With specific reference to FIGS. 3 through 6 of the drawings, there is shown cross-sectional views of an embodiment of a fiber optic connector utilizing a fiber array ferrule 20. The fiber array ferrule 20 comprises a pre-alignment portion 22 and a collar 21. The connector comprises a housing 1 having a mating end 10 and a nonmating end 11. The housing 1 further has an axial passageway 2 in which the fiber array ferrule 20 is disposed. Adjacent the fiber array ferrule 20 and positioned toward the nonmating end 11, there is a guide pin retainer 23 for securely retaining up to two guide pins (not shown) positioned in respective guide pin holes (not shown) located through the ferrule 20. As is conventionally known, a fiber optic connecter using a fiber array ferrule may use none, one, or two guide pins or other protruding feature, such as an integral molded bump, to interconnect to a mating ferrule having two, one, or no guide pins, respectively, where each guide pin or protruding feature intermates with a correspondingly dimensioned guide pin hole or receiving element. Accordingly, the connectors as shown in the drawings will interconnect with a mating fiber optic connector using a mating fiber array ferrule having two guide pins disposed therein. For those connectors that do not house guide pins, the guide pin retainer 23 is used as a spacing element advantageously permitting uniformity of parts in the connector assembly. A spring 25 is disposed in a position within the housing 1 to bias the guide pin retainer 23 and ferrule 20 toward the mating end 10 of the connector. A retention body 26 is recessed toward the mating end 10 to hold the spring 25 in proper position within the housing 1 and in proper axial alignment with the ferrule 20. The retention body 26 latches onto the nonmating end 11 of the connector to capture the ferrule 20, guide pin retainer 23, and spring 25 within the housing 1 so that the connector may be handled as a unit without risk of disassembly. An internal geometry of the connector housing 1 comprises a ferrule alignment structure 3 that constrains radial or off axis movement of the ferrule 20 when the connector is in an unmated condition and permits increased radial or off axis movement (termed "float") of the ferrule 20 relative to the housing 1 when the connector is in a mated condition.

Figure 5:
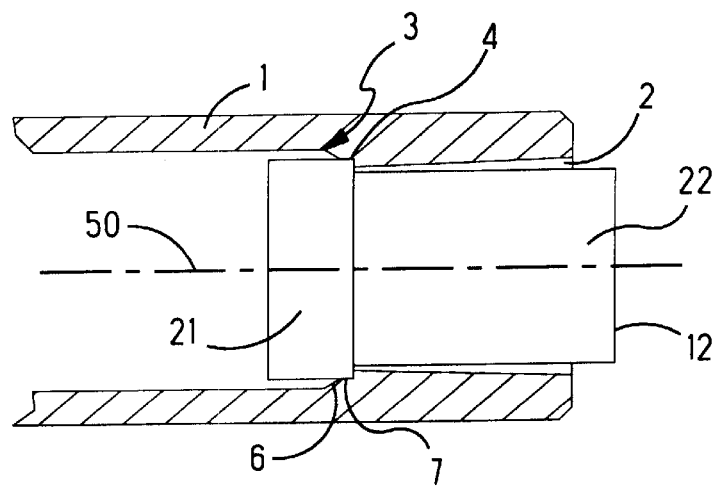
FIG. 5 is an enlarged transverse cross-sectional view of the embodiment of a fiber optic connector shown in FIG. 4 of the drawings.
Figure 6:
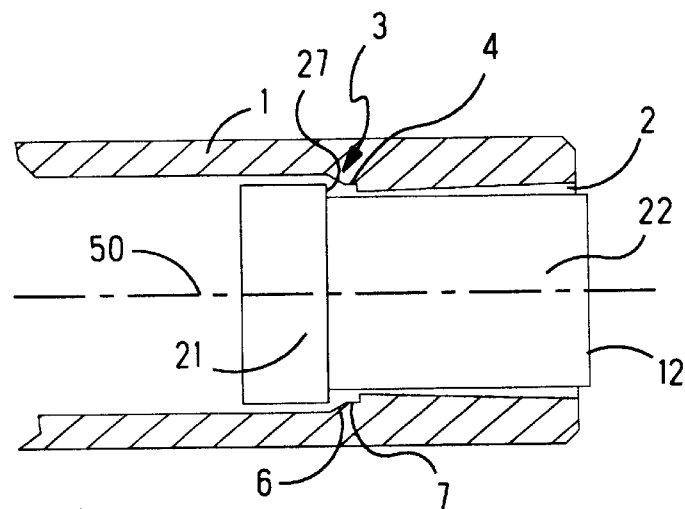
FIG. 6 is an enlarged transverse cross-sectional view of the embodiment of a fiber optic connector shown illustrated in FIG. 4 of the drawings, but shown in a mated condition.

One embodiment of the ferrule alignment structure 3 is best shown in FIGS. 5 and 6 of the drawings and takes the form of an internal annular flange creating an interference shoulder 4. The interference shoulder 4 creates a reduction in the cross-sectional size of the passageway 2. The cross-sectional dimensions of the passageway 2 at the interference shoulder 4 permit clearance of the pre-alignment portion 22 of the ferrule 20 and create interference with a transverse face 27 of the enlarged collar 21 of the ferrule 20. The ferrule alignment structure 3 further comprises an enlargement of the internal cross-sectional dimensions of the passageway 2 creating an alignment recess 7 extending directly from the interference shoulder 4. The dimension of the alignment recess 7 is sufficient to accommodate receipt of the enlarged external cross-sectional dimension of the collar 21 on the ferrule 20 while remaining small enough to limit radial or off axis movement of the ferrule 20 relative to the housing 1 when the connector is in an unmated condition. In the unmated condition, the spring 25 exerts an axial force on the spring retainer 26 which in turn pushes against the ferrule 20 to bias the ferrule 20 toward the mating end 10 of the connector. In the absence of an axial force opposing the spring force on the ferrule 20, as is the case when the connector is in the unmated condition, the transverse face 27 of the collar 21 abuts the interference shoulder 4 of the ferrule alignment structure 3. Interference between the ferrule collar 21 and the interference shoulder 4 axially retains the ferrule 20 within the housing 1. Sides of the ferrule collar 21 closely fit into the alignment recess 7 to maintain the proper transverse position of the ferrule 20 relative to the housing 1. The alignment recess 7, therefore, constrains the transverse or off-axis movement of the ferrule 20 relative to the housing 1 when the connector is in the unmated condition. In the disclosed embodiment, the external geometry of the housing 1 and the relative position of the ferrule 20 relative to the housing 1 provides a first stage of alignment (or "pre-alignment") between mating guide pins and corresponding guide pin holes. A second and ultimate stage of alignment occurs during receipt of the guide pins into the guide pin holes. During the second stage of alignment, the relative position of the ferrule 20 to the housing 1 is of secondary importance to the alignment process. Off-axis movement of the ferrule 20 limited in this way during the prealignment stage allows the external geometry of the housing 1 to position the pre-alignment portion 22 of the ferrule 20 relative to a mating ferrule 20 or other mating optical device to provide pre-mating alignment of the guide pins and guide pin holes to the mating connector or other optical device, such as an optical source, receiver, or transceiver.

The ferrule alignment structure 3 as show in FIGS. 3 through 6 of the drawings further comprises a ferrule release structure 5 that permits increased radial or off axis movement of the ferrule 20 when the connector is in a mated condition after the second alignment stage. The ferrule release structure 5, an embodiment of which is shown in FIG. 6 of the drawings, takes the form of an annular tapered enlargement lip 6 on the internal geometry of the housing 1 which tapers at an angle of approximately 45 degrees along the transverse length of the ferrule alignment structure 3. The enlargement lip 6 extends directly from the alignment recess 7. Although the enlargement lip 6 is illustrated as tapered, the taper is present for purposes of assembly ease, and for purposes of connector function, need not be tapered and may transition at a 90 degree angle. During the connector mating operation, once the guide pins are fully received within the guide pin holes of the mating ferrule and ferrule end faces 12 of the mating ferrules 20 are positioned in abutting relation, there is an axial force opposing the spring force places on an end face 12 of the ferrule 20 which partially overcomes the spring force of the spring 25 and causes the spring to compress. As a consequence, the ferrule 20 moves toward the nonmating end 11 of the connector and the transverse face 27 of the ferrule collar 21 disengages the interference shoulder 4. At the end of the mating sequence, the transverse face 27 of the collar 21 clears the alignment recess 7 and is disposed along a mating axis 50 in the ferrule release structure 5 and at a point clear of the alignment recess 7 and toward the nonmating end 11 of the connector. The precise position of the transverse face 27 of the collar 21 depends upon the mechanical tolerances of the connector elements 1, 3, 5, 20, 23, and 25 and the magnitude of the opposing axial force placed on the endface 12 of the ferrule 20. When the collar 21 is positioned toward the nonmating end 11 of the connector so as to clear the alignment recess 7, the housing 1 may move in a transverse or off axis direction relative to the ferrule 20 when the housing 1 is subject to an external load or force without adversely affecting ferrule mating alignment.

Figure 7:
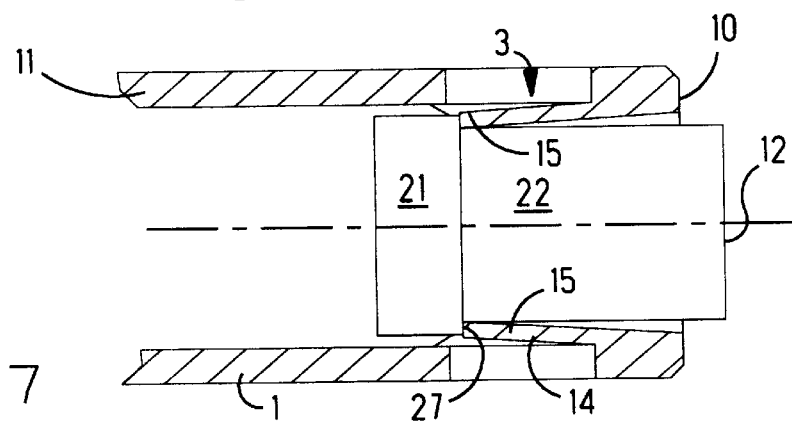
FIG. 7 is an enlarged transverse cross-sectional view of a second embodiment of a fiber optic connector according to the teachings of the present invention shown in an unmated condition.
Figure 8:
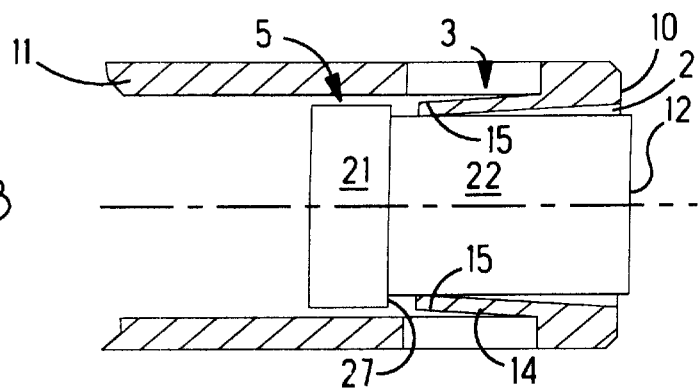
FIG. 8 is an enlarged transverse cross-sectional view of the embodiment shown in FIG. 7 shown in a mated condition.

With specific reference to FIGS. 7 and 8 of the drawings, there is shown an alternate embodiment of the ferrule alignment structure 3 in which two cantilever beams 14 have a fixed end integral with the housing 1. Each beam 14 has the fixed end toward the mating end 10 of the housing 1 and angles toward the nonmating end 11 of the housing 1. The free end 15 of each beam 14 comprises the interference shoulder 4 and engages the transverse face 27 of the collar 21 of the ferrule 20 interfering with axial movement of the ferrule 20 relative to the housing 1 in a mating direction. The presence of the beams 14 provide for alignment of the ferrule 20 relative to the housing as well as a certain amount of transverse compliance when the connector is in the unmated condition which is approximately equal to the transverse compliance available when the connector is in a mated condition. In the mated condition, an enlarged view of which is illustrated in FIG. 8 of the drawings, the transverse face 27 of the ferrule 20 lifts off of the free ends 15 of the beams 14. The cantilever beams 14 are biased inwardly to engage the pre-alignment portion 22 of the ferrule providing resilient transverse float as well as centering of the pre-alignment portion 22 when the connector is in the mated condition as well as when the connector returns to the unmated condition.

Figure 9:
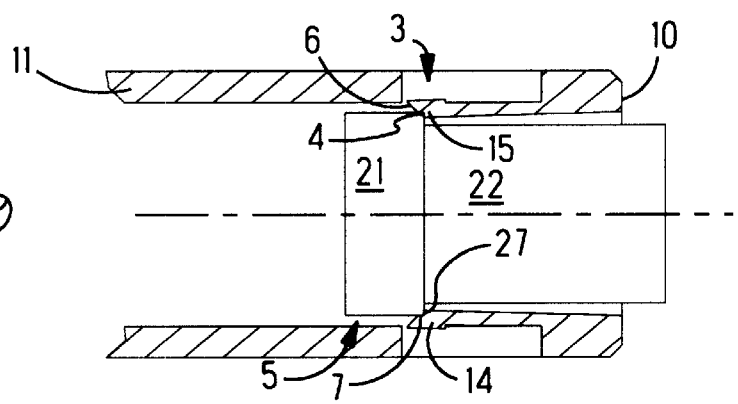
FIG. 9 is an enlarged transverse cross-sectional view of a third embodiment of a fiber optic connector according to the teachings of the present invention shown in an unmated condition.

With reference to FIG. 9 of the drawings, there is shown another alternate embodiment according to the teachings of the present invention having the cantilever beams 14 as the ferrule alignment structure 3 and in which the free ends 15 of the beams 14 comprise the interference shoulder 4, the alignment recess 7, and the tapered enlargement lip 6. As in the embodiment illustrated in FIGS. 7 and 8 of the drawings, when the connector is in the unmated condition, the interference shoulder 4 constrains axial movement and the alignment recess 7 provides for transverse compliance of the ferrule 20 relative to the housing 1. In the mated condition, the transverse face 27 of the ferrule collar 21 lifts off and clears the interference shoulder 4. The beams 14 remain engaged with the pre-alignment portion 22 or the collar 21 of the ferrule 20 to permit compliant transverse or off axis movement of the ferrule 20 relative to the housing 1 and to provide a centering force.

Figure 10:
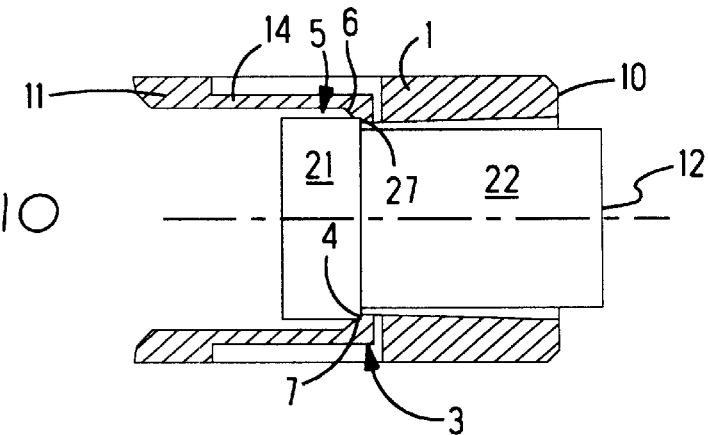
FIG. 10 is an enlarged transverse cross-sectional view of a fourth embodiment of a fiber optic connector according to the teachings of the present invention shown in an unmated condition.

With reference to FIG. 10 of the drawings, there is shown another alternate embodiment according to the teachings of the present invention having the cantilever beams 14 as the ferrule alignment structure 3 and in which the free ends 15 of the beams 14 comprise the interference shoulder 4, the alignment recess 7, and the tapered enlargement lip 6. The cantilever beams 14 in the embodiment shown in FIG. 10, however, have the fixed end toward the nonmating end 11 of the housing 1 and the free ends 15 are toward the mating end 10 of the housing 1. The free end 15 of each beam 14 comprises the interference shoulder 4 that engages the transverse face 27 of the collar 21 when the connector is in the unmated condition. Each beam 14 further comprises the alignment recess 7 in which the collar 21 is received to provide resilient transverse displacement of the ferrule 20 relative to the housing 1. When the connector is in the mated condition, the transverse face 27 of the collar 21 lifts off of the interference shoulder 4 and clears the alignment recess 7. The free ends 15 of the beams 14 engage the pre-alignment portion 22, or collar 21 of the ferrule 20 to provide resilient centering of the ferrule 20 as well as resilient displacement of the ferrule 20 relative to the housing 1 when the housing 1 is subject to an external load. When the connector transitions to the unmated condition from the mated condition, the axial biasing force from the spring returns the collar 21 of the ferrule 20 to proper seating position in the alignment recess 7 with the transverse collar 27 of the ferrule abutting the interference shoulder 4.

Figure 11:
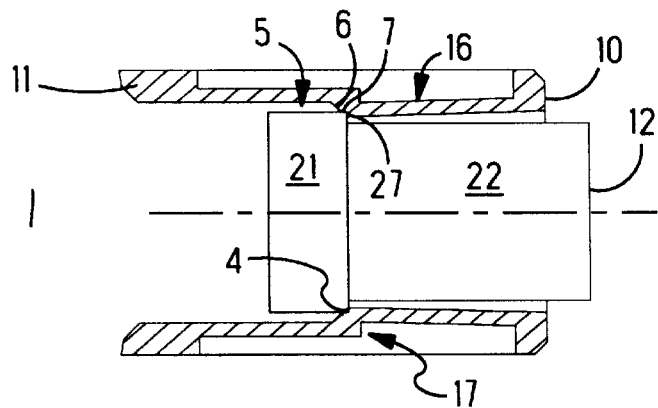
FIG. 11 is an enlarged transverse cross-sectional view of a fifth embodiment of a fiber optic connector according to the teachings of the present invention shown in an unmated condition.

With reference to FIG. 11 of the drawings, there is shown another alternate embodiment according to the teachings of the present invention having doubly supported compliant beams 16 with each end fixed and integral with the housing 1 as the ferrule alignment structure 3. A central portion 17 of each beam 16 comprises the ferrule alignment structure 3 including the interference shoulder 4, the alignment recess 7, and the tapered enlargement lip 6.

In all embodiments disclosed, the improved ferrule alignment and float are achieved through features located internal to the housing 1. An external geometry of the housing 1 permits engagement with a mating receptacle or another fiber optic connector (not shown) according to convention. The Figures disclose the housing having the ferrule alignment structure that aligns the ferrule 20 along a single transverse axis only. It is apparent, however, that similar features may also be included for the direction orthogonal to the disclosed transverse direction or radially with equally advantageous results depending only upon the needs of the specific connector and application. It is also apparent that although the teachings are directed to a connector that uses a fiber array ferrule, the teachings can be applied to a connector using a single fiber ferrule or to a copper based connector with a need for pre-mating alignment and post-mating float. Other advantages of embodiments of the invention are apparent from the detailed description by way of example, and from accompanying drawings and from the scope of the appended claims.

What is claimed is:

1. A fiber optic connector comprising:
a housing having an axial passageway defining a longitudinal axis and having a ferrule disposed in said passageway, said housing having a ferrule alignment structure that transversely aligns said ferrule by a direct interaction between said ferrule and said ferrule alignment structure when said connector is in an unmated condition, and that permits transverse displacement of said ferrule relative to said housing when said connector is in a mated condition.

2. A fiber optic connector as recited in claim 1 wherein said ferrule alignment structure further comprises an interference shoulder to resist axial travel of said ferrule in a mating direction.

3. A fiber optic connector as recited in claim 2 wherein said ferrule further comprises an enlarged collar and said alignment structure further comprises an alignment recess extending from the interference shoulder, wherein said enlarged collar is closely sized to said alignment recess to provide limited clearance between said enlarged collar and said alignment recess.

4. A fiber optic connector as recited in claim 3 wherein said axial passageway further comprises a ferrule release structure disposed adjacent said ferrule alignment structure toward a nonmating end of the connector.

5. A fiber optic connector as recited in claim 4 wherein said axial passageway tapers from said ferrule alignment structure to said ferrule release structure.

6. A fiber optic connector as recited in claim 1 wherein said ferrule further comprises an enlarged collar and said alignment structure further comprises a portion of the axial passageway having a reduced inner geometry, wherein said enlarged collar is closely sized to said reduced inner geometry of said axial passageway to provide limited clearance between said enlarged collar and said reduced inner geometry.

7. A fiber optic connector as recited in claim 1, and further comprising a biasing element providing an axial force on said ferrule toward a mating end of said axial passageway.

8. A fiber optic connector as recited in claim 1, said ferrule alignment structure comprising at least two cantilever beams engaging said ferrule when the connector is in an unmated condition.

9. A fiber optic connector as recited in claim 8, wherein said beams provide limited transverse compliance when said connector is in an unmated condition.

10. A fiber optic connector as recited in claim 9, wherein said ferrule disengages said beams when the connector is in a mated condition.

11. A fiber optic connector as recited in claim 8, wherein said free ends further include an enlargement lip.

12. A fiber optic connector of claim 8, wherein each of said cantilever beams includes an interference shoulder for preventing axial travel of said ferrule when said connector is in an unmated condition.

13. A fiber optic connector of claim 12, wherein each of said cantilever beams further includes an alignment recess structure extending from the interference shoulder for further preventing axial travel of said ferrule when said connector is in an unmated condition.

14. A fiber optic connector of claim 13, wherein each of said cantilever beams further includes a tapering structure extending from said alignment recess structure for permitting transverse displacement of said ferrule relative to said housing when said connector is in a mated condition.

15. A fiber optic connector comprising:
a housing having an axial passageway defining a longitudinal axis; and
a ferrule disposed in said axial passageway, the housing further comprising means for transversely aligning the ferrule relative to the housing by a direct interaction between the ferrule and said means when the connector is in an unmated condition, and for permitting transverse displacement of the ferrule relative to the housing when the connector is in a mated condition.

16. A fiber optic connector as recited in claim 15 wherein said means for transversely aligning and permitting transverse displacement comprises an enlarged collar on said ferrule and a ferrule alignment structure disposed in said passageway, said ferrule alignment structure having a reduced cross sectional dimension adjacent a ferrule release structure having an increased cross sectional dimension.

17. A fiber optic connector as recited in claim 15 wherein said means for transversely aligning and permitting transverse displacement comprises an enlarged collar on said ferrule and a ferrule alignment structure having an alignment recess adjacent a ferrule release structure.

18. A fiber optic connector as recited in claim 17 wherein said ferrule alignment structure further comprises an interference shoulder to resist axial travel of said ferrule in a mating direction.

19. A fiber optic connector as recited in claim 15 wherein said means for transversely aligning and permitting transverse displacement is integral with said housing.

20. A fiber optic connector as recited in claim 15, the ferrule further comprising an enlarged collar.

21. A fiber optic connector as recited in claim 15 wherein said means for transversely aligning and permitting transverse displacement further comprises a ferrule release structure.

22. A fiber optic connector as recited in claim 21 wherein said axial passageway tapers from a ferrule alignment structure to said ferule release structure.

23. A fiber optic connector as recited in claim 15, and further comprising a biasing element engaging said ferrule and urging said ferrule toward a mating end of the connector.

24. A fiber optic connector as recited in claim 15, said means for transversely aligning and permitting transverse displacement comprising at least two cantilever beams engaging said ferrule when the connector is in an unmated condition.

25. A fiber optic connector as recited in claim 24, wherein said beams provide limited transverse compliance when said connector is in an unmated condition.

26. A fiber optic connector as recited in claim 24, wherein said ferrule disengages said beams when the connector is in a mated condition.

27. A fiber optic connector as recited in claim 24, wherein free ends of said beams include an enlargement lip.

28. A fiber optic connector as recited in claim 15, said means for transversely aligning and permitting transverse displacement comprising at least two doubly supported beams engaging said ferrule when the connector is in an unmated condition.

29. A fiber optic connector as recited in claim 28, said doubly supported beams being cantilevered to compliantly engage said ferrule when the connector is in an unmated condition.

30. A fiber optic connector as recited in claim 29, each of said doubly supported beams further comprising an interference shoulder engaging an enlarged collar on said ferrule when the connector is in an unmated condition.

31. A fiber optic connector comprising a housing having a passageway defining a longitudinal axis, and a ferrule with an enlarged collar retained within the passageway, the housing retaining the ferrule in a mating direction wherein the improvement comprises:
a ferrule alignment structure within the passageway that transversely aligns the ferrule relative to the housing by a direct interaction between the ferrule and the ferrule alignment structure when the connector is in an unmated condition and that permits transverse displacement of the ferrule relative to the housing when the connector is in a mated condition.

32. A fiber optic connector as recited in claim 31 wherein said ferrule alignment structure constrains radial or off-axis movement of the ferrule relative to the housing when the connector is in a mated condition.

33. A fiber optic connector as recited in claim 32, and further comprising a ferrule release structure that permits radial movement of the ferrule relative to the housing when the connector is in a mated condition.

34. A fiber optic connector as recited in claim 33, wherein said means is integral with the housing.

35. A fiber optic connector comprising a housing having a passageway defining a longitudinal axis, and a ferrule with an enlarged collar retained within the passageway, wherein the improvement comprises:
means for transversely aligning the ferrule relative to said housing by a direct interaction between the ferrule and said means when the connector is in an unmated condition and for permitting transverse displacement of the ferrule relative to the housing when the connector is in a mated condition.

* * * * *